Reissued Feb. 7, 1928. Re. 16,874

UNITED STATES PATENT OFFICE.

ERNEST HOPKINSON, OF NEW YORK, AND WILLIS A. GIBBONS, OF LITTLE NECK, NEW YORK, ASSIGNORS TO REVERE RUBBER COMPANY, OF CHELSEA, MASSACHUSETTS, A CORPORATION OF RHODE ISLAND.

PROCESS FOR TREATING WATER EMULSIONS OF RUBBER AND PRODUCTS THUS PRODUCED.

No Drawing. Division of original No. 1,542,388, dated June 16, 1925, Serial No. 533,776, filed February 3, 1922. Application for reissue filed February 11, 1926. Serial No. 87,697.

DIVISION B.

This invention relates to processes for treating water emulsions of rubber, that is rubber latex or similar material either in its original state or diluted; and to the products so produced.

An object of the invention is to provide a process wherein the fluid portion of the latex may be removed to produce a latex of higher rubber concentration and containing a lower percentage of non-rubber constituents. Another object is to provide a method for concentrating rubber latex.

The invention accordingly consists in segregating or collecting the rubber containing portion of a latex by withdrawing the aqueous portion thereof from the latex preferably without the use of heat.

This application is a division of application for reissue No. 85,602, filed February 2, 1926.

It has been found that the deposit of rubber made by the immersion of porous materials in latex serves as a convenient means for concentrating the latex and obtaining a substance which may be reconverted into the original latex by simple addition of water. In other words the deposit on the surface of the porous material if placed in water will return to latex. Pressure of the particles or agitation in forming the deposit on the form prior to their immersion in the water should be avoided as such action tends to cause the deposit to form a mass which upon addition of water may be partially or wholly incapable of being converted into latex. The material removed from the porous surface contains normally 80–85% of rubber.

It has been found that the rate of deposition of the rubber on the porous material varies with the time of immersion, and the thickness of the deposit lessens for successive equal intervals of time regardless of the nature of the absorbent medium.

Substantially any porous material capable of sucking up water by capillarity appears to be able to deposit latex on its surface, and to permit its removal therefrom. Of course it should not be porous to an extent such that the latex as a whole may pass through it. Surfaces which are satisfactorily absorbent but not sufficiently smooth can be made smooth by polishing or immersing them in a suspension of finely powdered china clay or similar porous material in finely powdered form with a subsequent drying of the china clay or other coating on the form. Instead of this dipping, the clay or other material may be rubbed or brushed on to the porous material. In place of the unglazed porcelain or china mentioned above the material known as silocel may be employed for making the desired porous materials. This is a natural deposit of tightly compressed, diatomaceous earth.

Many of the water soluble constituents of the latex are withdrawn in solution from the latex into the interior of the porous material employed so that the deposit of rubber on the surface is lower in protein and salt content than would be obtained if the latex were evaporated down with all these constituents. The soluble constituents drawn into the porous material may be washed out by immersion of the porous material in fresh water or by any other desired means such as by heating or chemicals.

Where substances are admixed it is preferred to keep the latex with the added material in agitation. This may be satisfactorily accomplished in the case of articles formed on the interior of a porous material as above described by rotation of the porous material.

According to the above described process it is therefore possible to prepare a concentrated uncoagulated dispersion of rubber which may contain as high as 80–85% of rubber and due to the fact that the porous material permits the exit of the aqueous portion of the latex, this concentrated latex will contain an appreciably lesser amount of non-rubber soluble materials such as soluble nitrogenous matter, inorganic salts, etc. than will be found in an untreated latex.

It is apparent that the above invention may be utilized to prepare a purified latex having a rubber concentration which may be as high as 80–85%. It is likewise apparent from these facts that the process of the invention may be employed to bring latices containing varying amounts of rubber and of non-rubber soluble materials to a more or less uniform standard of rubber content and containing a considerably decreased percentage of the soluble non-rubber constituents which have long been recognized as the prime causes of variability in rubber. The product of this invention may therefore be described as purified, concentrated and standardized.

The latex employed in carrying out the process is preferably that which has been preserved by addition of ammonia, formaldehyde, or other stabilizer or preservative, but if desired a latex free from such materials may also be employed containing 20–35% rubber.

Having thus described our invention, what we claim and desire to protect by Letters Patent is:

1. A process for concentrating latex which comprises continuously withdrawing moisture from within a body of latex without elevating its temperature and segregating the uncoagulated concentrated latex in said body and recovering an uncoagulated product.

2. A process for concentrating latex which comprises withdrawing moisture therefrom by porous material, collecting the concentrated latex on the surface of said material and recovering the uncoagulated product.

3. A process for concentrating latex which comprises bringing latex in contact with a porous structure impermeable to latex as a whole but permeable to the water and dissolved constituents therein, depositing a coating on the structure having an uncoagulated rubber content higher than that of the original latex, and removing therefrom the uncoagulated product.

4. A process for concentrating latex which comprises bringing latex in contact with a porous structure impermeable to latex as a whole but permeable to the water and dissolved constituents therein, depositing a coating on the structure having a rubber content of 80 to 85%, and removing therefrom an uncoagulated product.

5. As a new product a concentrated substantially uncoagulated water emulsion of *Hevea braziliensis* rubber particles containing less non-rubber constituents than natural latex, said concentrated emulsion being capable of standing without separation of its aqueous portion.

6. As a new product a concentrated substantially uncoagulated *Hevea braziliensis* rubber latex containing a sub-normal amount of water-soluble non-rubber constituents, said concentrated latex being capable of standing without separation of its aqueous portion.

7. As a new product a concentrated substantially uncoagulated *Hevea braziliensis* rubber latex containing a preservative and having a sub-normal amount of non-rubber constituents, said concentrated latex being capable of standing without separation of its aqueous portion.

8. As a new composition of matter, a rubber emulsion representing a concentrated, purified and standardized *Hevea braziliensis* latex, said emulsion being of thick consistency and being alkaline in reaction, said concentrated latex being capable of standing without separation of its aqueous portion.

9. As a new composition of matter, a rubber emulsion representing a concentrated, purified and standardized *Hevea braziliensis* latex, said emulsion being of thick consistency, being alkaline in reaction and the aqueous phase containing less proportions of soluble non-caoutchouc solids than those normal to latex, said concentrated latex being capable of standing without separation of its aqueous portion.

Signed at New York, New York, this 4th day of February, 1926.

ERNEST HOPKINSON.
WILLIS A. GIBBONS.